(12) United States Patent
Lightbody et al.

(10) Patent No.: US 9,254,766 B2
(45) Date of Patent: Feb. 9, 2016

(54) SIDEWALL INTEGRATED ARMREST FOR AIRCRAFT INTERIORS

(71) Applicant: B/E AEROSPACE, INC., Wellington, FL (US)

(72) Inventors: Stephanie N. Lightbody, Snohomish, WA (US); Jefferey M. McKee, Duvall, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/245,835

(22) Filed: Apr. 4, 2014

(65) Prior Publication Data

US 2014/0300149 A1   Oct. 9, 2014

Related U.S. Application Data

(60) Provisional application No. 61/808,981, filed on Apr. 5, 2013.

(51) Int. Cl.
| | |
|---|---|
| *B60N 2/32* | (2006.01) |
| *B60N 2/46* | (2006.01) |
| *B64D 11/06* | (2006.01) |
| *B64C 1/06* | (2006.01) |

(52) U.S. Cl.
CPC ............... *B60N 2/466* (2013.01); *B64C 1/066* (2013.01); *B64D 11/06* (2013.01); *B64D 11/0646* (2014.12); *Y10T 29/49826* (2015.01)

(58) Field of Classification Search
CPC ..... B64D 11/0646; B64D 11/06; B60N 2/466
USPC .............. 297/188.14, 411.21, 232; 244/118.6
See application file for complete search history.

(56) References Cited

U.S. PATENT DOCUMENTS

| | | | | |
|---|---|---|---|---|
| 2,310,573 | A | * | 2/1943 | Burton ....................... 244/118.6 |
| 2,332,841 | A | * | 10/1943 | Buckwalter et al. ........ 244/118.6 |
| 4,674,713 | A | * | 6/1987 | Ryan et al. ................. 244/122 R |
| 6,398,164 | B1 | * | 6/2002 | Fasse ......................... 244/118.6 |
| 6,616,099 | B2 | * | 9/2003 | Sankrithi ................... 244/118.6 |
| 6,739,552 | B2 | * | 5/2004 | Sankrithi et al. ........... 244/118.6 |
| 6,752,462 | B1 | * | 6/2004 | Kain et al. ................ 297/411.38 |
| 7,311,354 | B2 | * | 12/2007 | Giasson ........................ 297/161 |
| 8,413,762 | B1 | * | 4/2013 | Wang et al. ................... 181/292 |
| 2003/0071507 | A1 | | 4/2003 | Sankrithi |
| 2004/0164577 | A1 | * | 8/2004 | Shabana et al. .............. 296/1.09 |
| 2005/0194806 | A1 | * | 9/2005 | Cowelchuk et al. ......... 296/1.09 |

(Continued)

OTHER PUBLICATIONS

International Search Report and Written Opinion of the ISA/US issued in related application PCT/US2014/033074, Aug. 27, 2014, 8 pages.

*Primary Examiner* — Laurie Cranmer
(74) *Attorney, Agent, or Firm* — Drinker Biddle & Reath LLP

(57) ABSTRACT

A sidewall integrated armrest includes a plurality of armrest segments upon which an arm may rest. Each of the plurality of armrest segments are supported by a structure proximate a sidewall and adjacent to but not supported by a seat. Each of the seats is disposed in a line along the sidewall and spaced apart at a seating pitch. The armrest further includes at least one armrest spacer disposed between the plurality of armrest segments. The at least one armrest spacer has a combined length between the plurality of armrest segments to establish a pitch between the plurality of armrest segments substantially equal to the seating pitch.

20 Claims, 3 Drawing Sheets

(56) References Cited

U.S. PATENT DOCUMENTS

| | | |
|---|---|---|
| 2007/0273177 A1 | 11/2007 | Sankrithi et al. |
| 2009/0179110 A1* | 7/2009 | Leyens ........................ 244/129.4 |
| 2013/0002001 A1* | 1/2013 | Allen et al. ................. 297/411.3 |

\* cited by examiner

SIDEWALL INTEGRATED ARMREST FOR AIRCRAFT INTERIORS

CROSS-REFERENCE TO RELATED APPLICATION

This application claims the priority benefit of U.S. Provisional Patent Application No. 61/808,981, entitled "Sidewall Integrated Armrest for Aircraft Interiors" and filed on Apr. 5, 2013, in the United States Patent and Trademark Office, the disclosure of which is incorporated herein by reference in its entirety.

BACKGROUND

1. Field

Embodiments relate to armrests for aircraft seating. More specifically, embodiments relate to a sidewall integrated armrest for an aircraft interior.

2. Related Art

Conventional armrests for use in aircraft typically are attached to and supported by an associated seating structure. This leaves unutilized dead space between the seating structure and the sidewall of the aircraft. Efficient utilization of space is an important goal of aircraft interior designs. In commercial aircraft in particular, maximizing space available for revenue generating uses is an important consideration.

SUMMARY

According to an embodiment, a sidewall integrated armrest includes a plurality of armrest segments upon which an arm may rest. Each of the plurality of armrest segments is supported by a structure proximate a sidewall and adjacent to but not supported by a seat. Each of the seats is disposed in a line along the sidewall and spaced apart at a seating pitch. The sidewall integrated armrest also includes at least one armrest spacer disposed between the plurality of armrest segments. The at least one armrest spacer has a combined length between the plurality of armrest segments to establish a pitch between the plurality of armrest segments substantially equal to the seating pitch.

According to another embodiment, a seating system includes a plurality of rows of seating disposed in a line adjacent a sidewall. The rows of seating are spaced apart at a seating pitch, with each of the rows of seating including a seat adjacent the sidewall having no armrest coupled with the seat adjacent the sidewall. The seating system also includes a plurality of armrest segments mounted on a support structure in a line proximate the sidewall. Each of the plurality of armrest segments is adjacent the seat adjacent the sidewall of a respective row of seating. The seating system further includes at least one armrest spacer mounted on the support structure in a line proximate the sidewall between the plurality of armrest segments. The at least one armrest spacer has a combined length between the plurality of armrest segments to establish a pitch between the plurality of armrest segments substantially equal to the seating pitch.

According to another embodiment, a method of configuring rows of seating and a sidewall integrated armrest includes mounting a plurality of rows of seating in a line adjacent a sidewall spaced apart at a seating pitch. Each of the rows of seating includes a seat adjacent the sidewall having no armrest coupled with the seat adjacent the sidewall. The method also includes mounting a plurality of armrest segments on a support structure in a line proximate the sidewall. Each of the plurality of armrest segments is adjacent the seat adjacent the sidewall of a respective row of seating. The method further includes mounting at least one armrest spacer on the support structure in a line proximate the sidewall between the plurality of armrest segments. The at least one armrest spacer has a combined length between the plurality of armrest segments to establish a pitch between the plurality of armrest segments substantially equal to the seating pitch.

While the exemplary embodiments described herein are presented in the context of seating for an aircraft cabin, these embodiments are exemplary only and are not to be considered limiting. The embodiments of the apparatus are not limited to seating for an aircraft cabin. The embodiments may be used in various other vehicles including, but not limited to, spacecraft, ships, buses, trains, recreational vehicles, trucks, automobiles, and the like. Embodiments of the apparatus may also be used in homes, offices, hotels, factories, warehouses, garages, and other locations where it may be desirable to have increased efficiency of space utilization for seating adjacent a wall or partition.

BRIEF DESCRIPTION OF THE DRAWINGS

Exemplary embodiments will be explained in more detail with reference to the attached drawings in which the embodiments are illustrated as briefly described below.

DETAILED DESCRIPTION

A sidewall integrated armrest for aircraft interiors replaces a conventional seat-mounted armrest of an aircraft seat adjacent a sidewall. In embodiments of aircraft cabins including the sidewall integrated armrest, a row of seats adjacent a sidewall of the aircraft will differ from a conventional row of seats in that the seat immediately adjacent the sidewall may not have an armrest adjacent the sidewall connected to or integrated with and supported by the seat, but may have an armrest connected to or integrated with and supported by the seat that is adjacent another seat or an aisle on an opposite side of the seat than the sidewall. The armrest immediately adjacent the sidewall connected to or integrated with and supported by the conventional seat is replaced by a sidewall integrated armrest that is supported by a support structure separate from the seat and proximate the sidewall in these embodiments. Furthermore, in these embodiments, the sidewall integrated armrest is integrated with the sidewall in a flexible and reconfigurable sidewall integrated armrest system.

Figure 1:
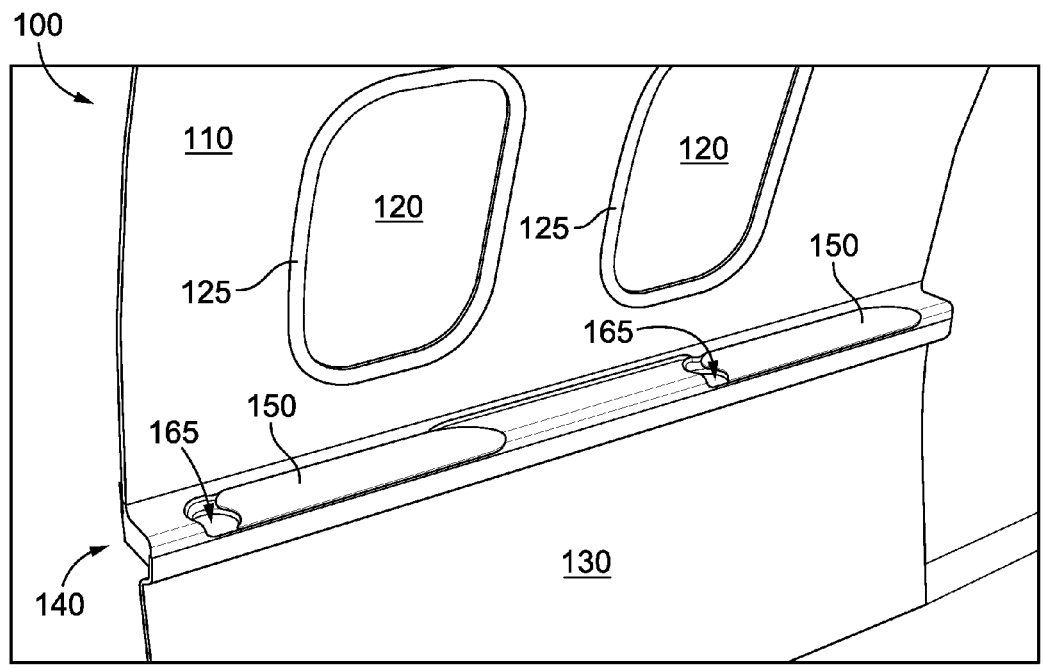
FIG. 1 is a perspective view that illustrates an integrated armrest system, according to an embodiment.
Figure 2:
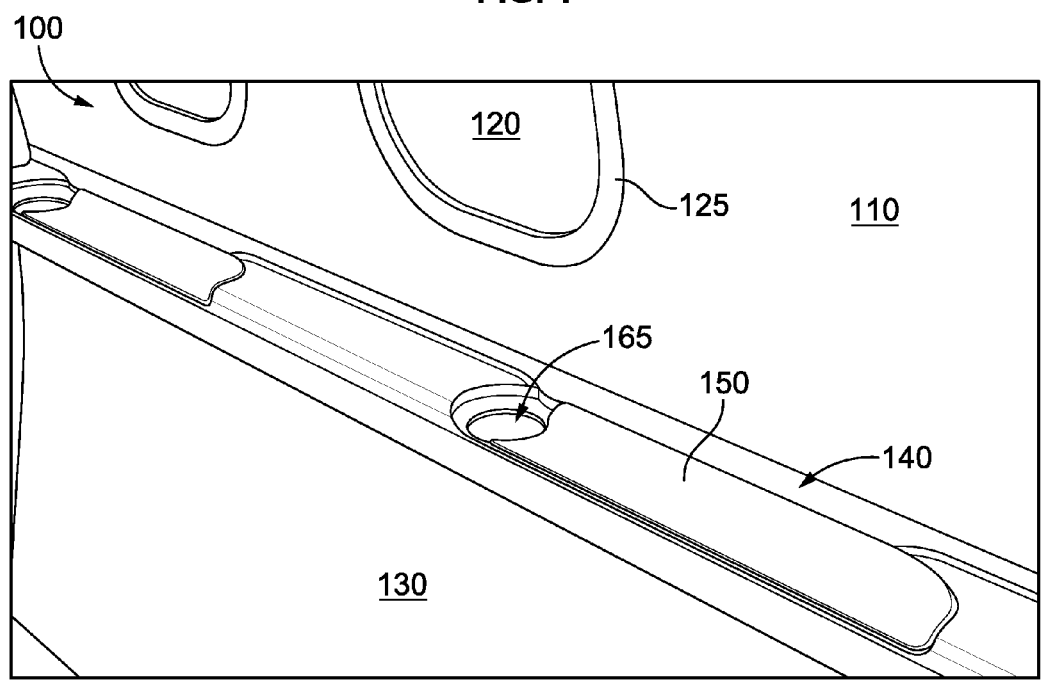
FIG. 2 is another perspective view that illustrates the integrated armrest system of FIG. 1 from a different perspective, according to an embodiment.

FIG. 1 illustrates a perspective view of an integrated armrest system 100, according to an embodiment. FIG. 2 illustrates another perspective view of the integrated armrest system 100 of FIG. 1 from a different perspective, according to an embodiment. The integrated armrest system 100 may be integrated in the sense that the armrest system 100 includes a number of parts that are joined together to form the armrest system 100 together with a sidewall 110 that may include openings for windows 120 above the armrest 140. The windows 120 may be surrounded by window frames or bezels 125.

The integrated armrest system 100 may be constructed and installed separately from the sidewall 110. The armrest system 100 includes an armrest 140 that runs horizontally along the sidewall 110, and that is constructed and installed separately between the sidewall 110 above the armrest 140 and a dado panel 130 below the armrest 140. Each of the sidewall 110, dado panel 130, and armrest 140 may be affixed to or coupled with an interior wall or frame of an aircraft using one or more support structures. The one or more support structures may include structural teeth fastened to the structure of the aircraft. In some embodiments, a different support structure may support each of the sidewall 110, dado panel 130, and armrest 140, but in other embodiments, a same support structure may support each of the sidewall 110, dado panel 130, and armrest 140. The armrest 140 may be supported by a secondary structure that facilitates the armrest 140 being installed separately and independently from the sidewall 110 and the dado panel 130.

The armrest 140 includes armrest pads 150 which are spaced apart from one another according to a pitch of rows of seats in the aircraft cabin, for example at 29 inch spacing, 30 inch spacing, 31 inch spacing, 32 inch spacing, or other spacing as may be appropriate for the aircraft cabin. The armrest pads 150 may be seated in indentations or armrest wells within the armrest 140. Each of the armrest wells may have a cupholder region 165 at one end of the armrest pad 150 that are formed to hold a cup or other personal effects of a passenger that would be seated adjacent the armrest pad 150. The armrest pad 150 may also be contoured to hold the cup or other personal effects in conjunction with walls of the armrest well at the cupholder region 165. The armrest pad 150 may be constructed of leather, vinyl, a faux leather material, a plastic material, or other material as known in the art. The armrest pad 150 may also include padding or a cushion.

Figure 3:
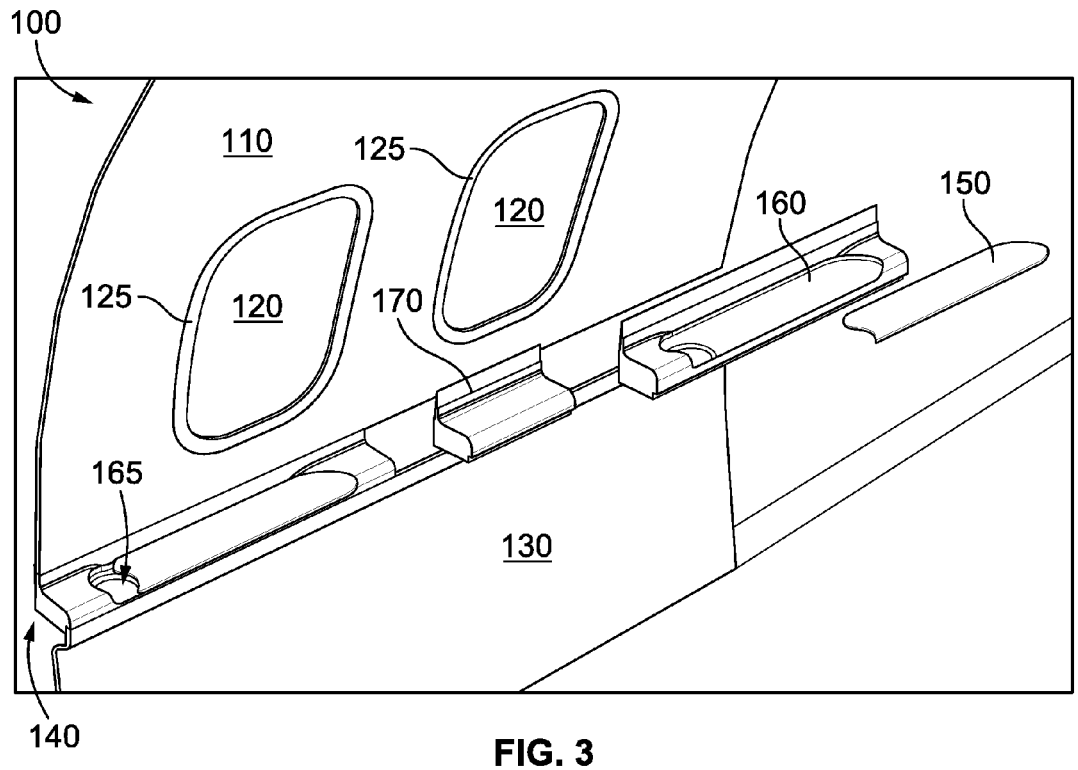
FIG. 3 is an exploded perspective view that illustrates the integrated armrest system of FIG. 1, according to an embodiment.
Figure 4:
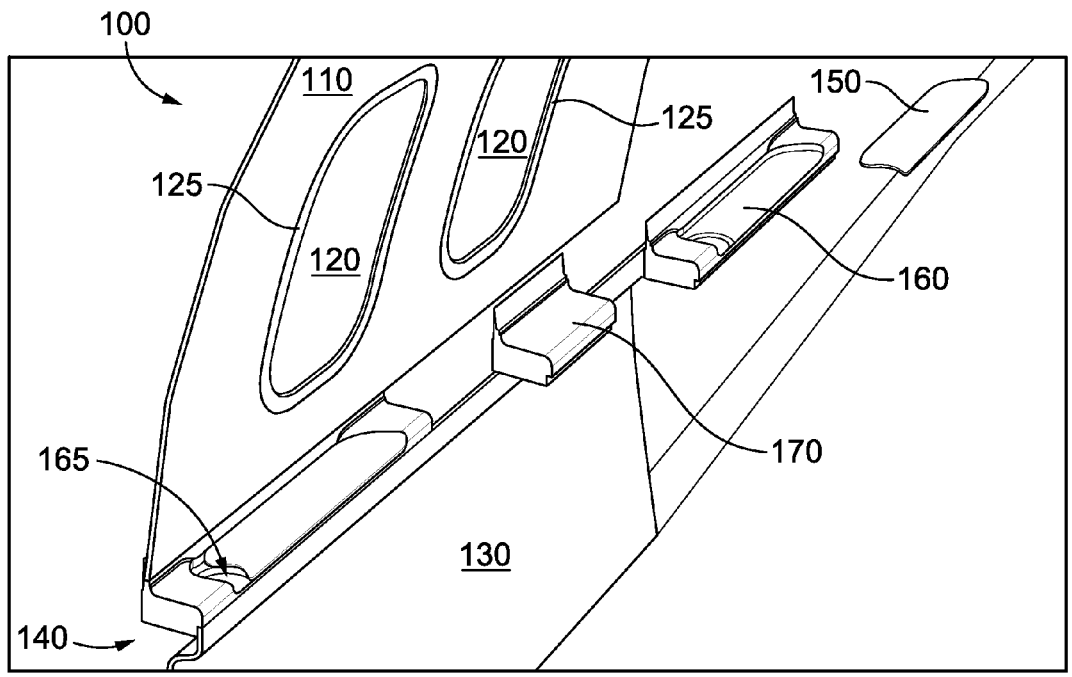
FIG. 4 is an exploded perspective view that illustrates the integrated armrest system of FIG. 1 from a different perspective, according to an embodiment.

FIG. 3 illustrates an exploded perspective view of the integrated armrest system of FIG. 1, according to an embodiment. FIG. 4 illustrates an exploded perspective view of the integrated armrest system of FIG. 1 from a different perspective, according to an embodiment. The armrest 140 may include one armrest segment 160 per corresponding seat row. Each armrest segment 160 may include an indentation or armrest well in which the armrest pad 150 is disposed. This should not be construed as limiting, as in various embodiments, the armrest pad 150 may be integrated with the armrest segment 160, or the armrest segment 160 may not include a separate armrest pad 150.

A top lip of the dado panel 130 may go outside a lower portion of the armrest 140. The top lip of the dado panel 130 may fasten to a secondary support structure that is a part of a support structure that supports a top end of the dado panel 130. The sidewall 110 may be captured and supported by the same or a different support structure above the dado panel 130. The sidewall 110 may have a lower lip that goes outside an upper portion of the armrest 140. The armrest 140 may be fastened to the body of the aircraft using a support structure independently of the sidewall 110 and the dado panel 130.

The armrest segment 160 may have a length corresponding to a minimum pitch between seat rows in the aircraft cabin, for example, 29 inches between the front of a first row of seats and the front of the next row of seats behind the first row of seats. For compatibility with different seat row pitches, one or more armrest spacers 170 may be disposed in the armrest 140 between armrest segments 160 corresponding to adjacent rows of seating. The armrest spacer 170 may have a length corresponding to a difference between the length of the armrest segment 160 and the pitch between adjacent rows of seating in the aircraft cabin. For example, if the length of the armrest segment 160 is set to a minimum pitch between adjacent rows of seating of 29 inches, and the pitch between adjacent rows of seating in a particular region of an aircraft cabin is set at 31 inches, the armrest spacer 170 may have a length of 2 inches. Therefore, by combining the armrest segment 160 having a length of 29 inches with the armrest spacer 170 having a length of 2 inches, the armrest pads 150 may be properly positioned adjacent each row of seats in the aircraft cabin when the rows of seating have a pitch of 31 inches, because the armrest pads 150 have the same or substantially the same pitch as the rows of seats. The pitch is considered substantially the same when one of ordinary skill in the art would recognize that the pitch is sufficiently the same to a degree of practical importance for the armrest pads 150 to provide support for arms to rest upon the armrest pads 150 in each row of seats. Minor variations in pitch, for example, by up to several inches in an embodiment, may exist between armrest pads 150 adjacent neighboring rows of seating while still being substantially the same as long as the armrest pad 150 adjacent each row of seating still provides adequate support for arms to rest upon the armrest pad 150. These dimensions of pitches and lengths should not be construed as limiting, but are exemplary only. In various embodiments, the pitches may be greater or less than the embodiments described above, and the lengths of the armrest spacer 170 and armrest segment 160 may also be greater or less than the embodiments described above.

Because the armrest 140 is configurable to match a pitch of the rows of seating independently of the sidewall 110 and the dado panel 130, the armrest 140 may be configured by the same entity that configures the rows of seating independently of the entity that configures the sidewall 110 and the dado panel 130. Furthermore, the armrest 140 may be reconfigured independently of the sidewall 110 and the dado panel 130. For example, if the owner and operator of the aircraft decides to change the pitch of the rows of seating after the aircraft has been in service, the armrest 140 may be reconfigured simply by adding or removing armrest spacers 170 between the armrest segments 160 according to the new pitch of the rows of seating, and adding or removing armrest segments 160 according to the new number of rows of seating, without changing the sidewalls 110 and dado panels 130 in the aircraft. This reconfiguration may be performed during maintenance and servicing of the aircraft, for example.

The armrest pads 150 may be removable for cleaning. In addition, because the components of the armrest 140 are modular, if one armrest pad 150 or armrest segment 160 becomes damaged, the damaged armrest pad 150 or armrest segment 160 may be replaced without replacing the entire armrest 140 that runs the length of the sidewall 110, the dado panel 130, or the entire aircraft cabin. Other components of the integrated armrest system 100 may also be replaced in a like manner.

Figure 5:
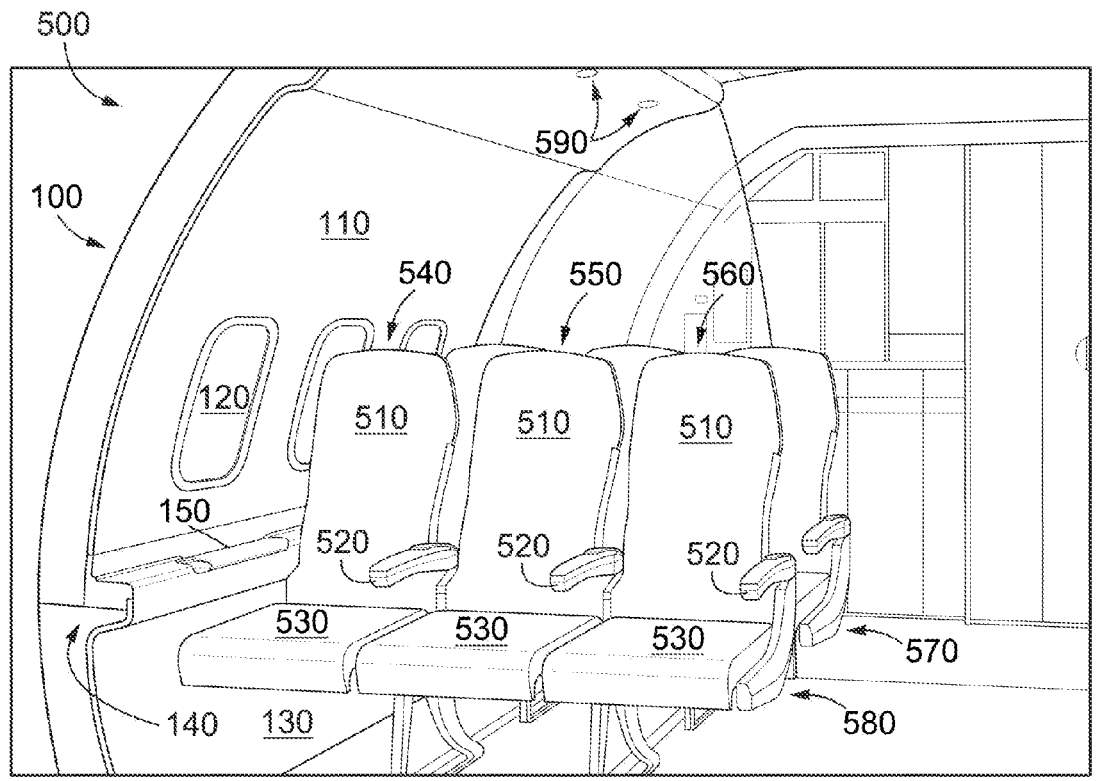
FIG. 5 is a perspective view that illustrates an aircraft cabin including the integrated armrest system of FIG. 1, according to an embodiment.

FIG. 5 illustrates a perspective view of an aircraft cabin 500 including the integrated armrest system 100 of FIG. 1, according to an embodiment. As illustrated, rows of seating 570 and 580 including window seats 540, middle seats 550, and aisle seats 560 having upright seatbacks 510, armrests 520, and seat bottoms 530 are installed immediately adjacent the integrated armrest system 100. The window seats 540 may be adjacent the windows 120, while the aisle seats 560 may be adjacent an aisle. The window seats 540 do not have conventional armrests 520 installed on the seats on a side adjacent the windows 120, but rather passengers seated in the window seats 540 make use of the armrests 140 of the integrated armrest system 100. In various embodiments, the aircraft cabin may include overhead personal service units (PSUs) 590 that may include reading lights, call buttons, air vents, etc.

The specific arrangement of seats shown in FIG. 5 should not be construed as limiting, as in various embodiments, seating may be arranged differently. For example, an aircraft cabin may have two seats between the sidewall 110 and an aisle on one side of the aircraft cabin, and two seats between the aisle and another sidewall 110 on the other side of the aircraft cabin. In another embodiment, the aircraft cabin may have one seat between the sidewall 110 and an aisle on one side of the aircraft cabin, and two seats between the aisle and another sidewall 110 on the other side of the aircraft cabin. In other embodiments, the aircraft cabin may have three seats between the sidewall 110 and an aisle on one side of the aircraft cabin, and three seats between the aisle and another sidewall 110 on the other side of the aircraft cabin. Other seating arrangements as known in the art may also be employed with multiple sets of seats between one or more aisles and the two exterior sidewalls of the aircraft cabin. In any given set of seats, there may be one, two, three, four, five, or more seats in a row.

By the configuration shown in FIG. 5, the seat bottoms 530 of the window seats 540 are positioned closer to the dado panel 130 than would be possible if the window seats 540 included conventional armrests 520 immediately adjacent the dado panel 130. The seat bottoms 530 of the window seats 540 may be positioned to avoid a gap between the seat bottoms 530 and the dado panel 130 that exists in conventional window seats onboard aircraft. This provides greater usable space and more comfort for passengers sitting in the window seats 540 compared to conventional window seats. The width of the seat bottoms 530 in the embodiments using the armrest 140 may be increased relative to conventional aircraft seating that include a conventional armrest adjacent the window and/or sidewall of the aircraft cabin. A passenger sitting in the window seat 540 may also feel a sense of a more private and secure seating arrangement, increasing the desirability of sitting in the window seat 540 compared to conventional aircraft cabin window seats. Embodiments' use of the armrest 140 instead of a conventional armrest 520 adjacent the dado panel 130 opens up more space for the window seat passenger to utilize, and makes use of what would otherwise be dead space between the seat bottom 530 and the dado panel 130.

The rows of seats 570 and 580 may have a 30 inch pitch from the front of the front row of seats 580 to the front of the back row of seats 570. The seat bottoms 530 may have a width of 18 inches. The pitch of the armrest pads 150 may be reconfigurable to match the pitch of both the rows of seating 570 and 580 and the overhead PSUs 590 at a same time when the pitch of the rows of seating and the PSUs are reconfigured, for example, when the aircraft is undergoing maintenance. The pitch may be reconfigurable in the manner discussed above with respect to FIGS. 3 and 4. For example, in the embodiment of FIG. 5, the armrest segment 160 may have a length of 29 inches, the armrest spacer 170 may have a length of 1 inch, and the armrest spacer 170 and armrest segment 160 may be alternated in a line to match the pitch of the rows of seating 570 and 580. These dimensions should not be construed as limiting, because in various embodiments, the pitch of the rows of seats may be greater or smaller, and the seat bottoms 530 may have greater or smaller width.

The armrest 140 may be contoured and/or cushioned to provide an ergonomic and comfortable support for a passenger seated in an adjacent window seat 540 to rest an arm or lean or recline against. The armrest 140 may be installed throughout the economy portion of a commercial aircraft cabin, adjacent rows of economy seats. In addition, the armrest 140 may be installed in other areas of the aircraft cabin, including the aft region, galley areas, lavatory areas, and other areas where the armrest 140 may optimize utilization of space and/or create a more comfortable environment for passengers.

Figure 6:
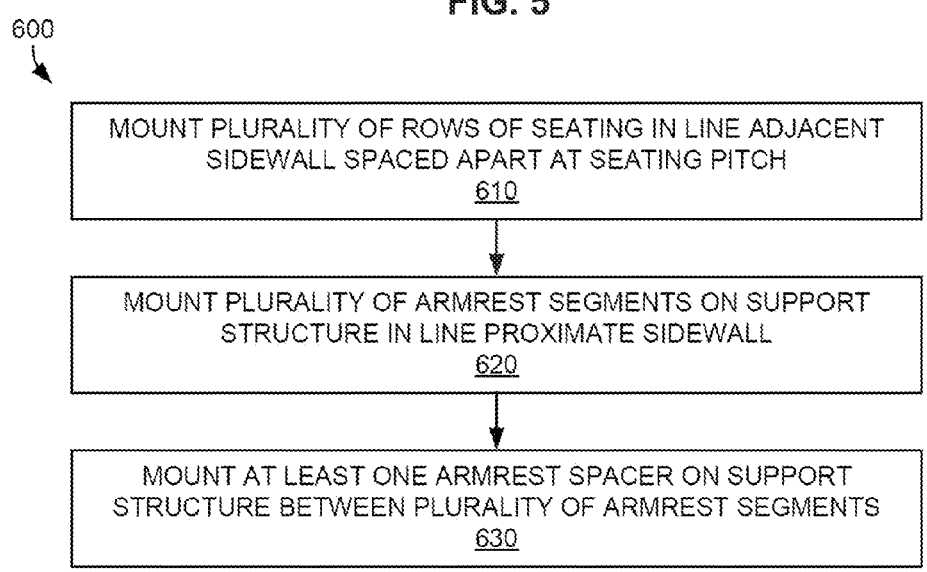
FIG. 6 is a block diagram illustrating a method of configuring rows of seating and a sidewall integrated armrest, according to an embodiment.

FIG. 6 is a block diagram illustrating a method 600 of configuring rows of seating and a sidewall integrated armrest, according to an embodiment. In a step 610, a plurality of rows of seating are mounted in a line adjacent a sidewall spaced apart at a seating pitch. Each of the rows of seating includes a seat adjacent to the sidewall that has no armrest coupled with the seat adjacent to the sidewall. In a step 620, a plurality of armrest segments are mounted on a support structure in a line proximate the sidewall. Each of the plurality of armrest segments is adjacent to the seat that is adjacent to the sidewall of a respective row of seating. In a step 630, at least one armrest spacer is mounted on the support structure in a line proximate the sidewall between the plurality of armrest segments. The at least one armrest spacer (e.g., several armrest spacers mounted adjacent to one another) has a combined length between the plurality of armrest segments to establish a pitch between the plurality of armrest segments substantially equal to the seating pitch. For example, one or more armrest spacers of relatively shorter lengths (e.g., 1 or 2 inches) or a single armrest spacer of a relatively larger length (e.g., 3 or 4 inches) may be mounted on the support structure between armrest segments so that the distance between the armrest segments is substantially equal to the distance between the seat backs of the seats in neighboring rows of seating.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A sidewall integrated armrest comprising:
    a plurality of armrest segments upon which an arm may rest, each of the plurality of armrest segments being supported by a structure proximate a sidewall and adjacent to but not supported by a seat, each of the seats being disposed in a line along the sidewall and spaced apart at a seating pitch;
    at least one armrest spacer disposed between the plurality of armrest segments, the at least one armrest spacer having a combined length between the plurality of armrest segments to establish a pitch between the plurality of armrest segments substantially equal to the seating pitch,
    wherein the at least one armrest spacer and the plurality of armrest segments have the same cross-sectional profile.

2. The armrest of claim 1, wherein each of the plurality of armrest segments includes an armrest pad.

3. The armrest of claim 2, wherein the armrest pad is disposed in an armrest well within the armrest segment.

4. The armrest of claim 3, wherein the armrest well includes a cupholder formed at one end of the armrest pad.

5. A seating system comprising:
    a plurality of rows of seating disposed in a line adjacent a sidewall, the rows of seating spaced apart at a seating pitch, each of the rows of seating including a seat adjacent the sidewall having no armrest coupled with the seat adjacent the sidewall;
    a plurality of armrest segments mounted on a support structure in a line proximate the sidewall, each of the plurality of armrest segments adjacent the seat adjacent the sidewall of a respective row of seating; and
    at least one armrest spacer mounted on the support structure in a line proximate the sidewall between the plurality of armrest segments, the at least one armrest spacer having a combined length between the plurality of armrest segments to establish a pitch between the plurality of armrest segments substantially equal to the seating pitch,
    wherein the at least one armrest spacer and the plurality of armrest segments have the same cross-sectional profile.

6. The system of claim 5, wherein the seat adjacent the sidewall included in each of the rows of seating has an armrest coupled with the seat on an opposite side of the seat from the sidewall.

7. The system of claim 5, further comprising the support structure, the support structure supporting the plurality of armrest segments and a dado panel disposed below the plurality of armrest segments.

8. The system of claim 5, further comprising the support structure, the support structure supporting the plurality of armrest segments separately from a dado panel disposed below the plurality of armrest segments.

9. The system of claim 5, further comprising a dado panel disposed below the plurality of armrest segments.

10. The system of claim 5, wherein each of the plurality of armrest segments includes an armrest pad.

11. The system of claim 10, wherein the armrest pad is disposed in an armrest well within the armrest segment.

12. The system of claim 11, wherein the armrest well includes a cupholder formed at one end of the armrest pad.

13. The system of claim 5, wherein a portion of at least one dado panel above or below the plurality of armrest segments and the at least one armrest spacer is disposed outside a portion of the plurality of armrest segments and the at least one armrest spacer.

14. A method of configuring rows of seating and a sidewall integrated armrest, the method comprising:
    mounting a plurality of rows of seating in a line adjacent a sidewall spaced apart at a seating pitch, each of the rows of seating including a seat adjacent the sidewall having no armrest coupled with the seat adjacent the sidewall;
    mounting a plurality of armrest segments on a support structure in a line proximate the sidewall, each of the plurality of armrest segments adjacent the seat adjacent the sidewall of a respective row of seating; and
    mounting at least one armrest spacer on the support structure in a line proximate the sidewall between the plurality of armrest segments, the at least one armrest spacer having a combined length between the plurality of armrest segments to establish a pitch between the plurality of armrest segments substantially equal to the seating pitch,
    wherein the at least one armrest spacer and the plurality of armrest segments have the same cross-sectional profile.

15. The method of claim 14, wherein the seat adjacent the sidewall included in each of the rows of seating has an armrest coupled with the seat on an opposite side of the seat from the sidewall.

16. The method of claim 14, further comprising including an armrest pad in each of the plurality of armrest segments.

17. The method of claim 16, further comprising disposing the armrest pad in an armrest well within the respective armrest segment.

18. The method of claim 17, further comprising forming a cupholder in the armrest well at one end of the armrest pad.

19. The method of claim 14, further comprising supporting the plurality of armrest segments and a dado panel disposed below the plurality of armrest segments using the same support structure.

20. The method of claim 14, further comprising supporting the plurality of armrest segments separately from a dado panel disposed below the plurality of armrest segments.

* * * * *